United States Patent
Wang

(10) Patent No.: US 10,024,684 B2
(45) Date of Patent: Jul. 17, 2018

(54) METHOD AND SYSTEM FOR AVOIDANCE OF ACCIDENTS

(71) Applicant: Kevin Sunlin Wang, Flushing, NY (US)

(72) Inventor: Kevin Sunlin Wang, Flushing, NY (US)

(73) Assignee: OPERR Technologies, Inc., Flushing, NY (US)

( * ) Notice: Subject to any disclaimer, the term of this patent is extended or adjusted under 35 U.S.C. 154(b) by 0 days.

(21) Appl. No.: 14/885,999

(22) Filed: Oct. 17, 2015

(65) Prior Publication Data

US 2016/0061625 A1    Mar. 3, 2016

Related U.S. Application Data

(60) Provisional application No. 62/236,666, filed on Oct. 2, 2015, provisional application No. 62/150,118, filed
(Continued)

(51) Int. Cl.
*G01C 21/36* (2006.01)
*G01C 21/32* (2006.01)
(Continued)

(52) U.S. Cl.
CPC ......... *G01C 21/3697* (2013.01); *G01C 21/32* (2013.01); *G01C 21/3691* (2013.01);
(Continued)

(58) Field of Classification Search
None
See application file for complete search history.

(56) References Cited

U.S. PATENT DOCUMENTS 6,751,549 B1 * 6/2004 Kozak ................. B61L 29/246
701/410
7,379,879 B1 * 5/2008 Sloo ................. G06Q 10/06311
705/325

(Continued)

OTHER PUBLICATIONS

"Help. Report Accidents not on your route" https://wiki.waze.com/forum/viewtopic.php?f=12&t=16044.*
(Continued)

*Primary Examiner* — Lail A Kleinman
(74) *Attorney, Agent, or Firm* — Monte, Wang & Associates, PLLC

(57) ABSTRACT

Embodiments herein provide a system and method for mapping traffic accidents, storing historical and real-time accidents data, other accidents related information. The data resides in the central server and implemented for alerting a user about traffic accidents based on location and type of category. The system and method comprises storing a plurality of historical and real-time traffic accidents for different categories of the users in a unified database. It further stores a plurality of other traffic accident related information, comprising reasons, time and data, category of the accident participants, further comprising non-commercial vehicles or commercial vehicles users, motorcyclists, bicyclists or pedestrians. The system and method uses an analysis mechanism to search and analyze historical or real-time traffic accidents data based on the category the user belongs to specific geocoded location and display the analyzed advisory notification on the basis of the user's location.

30 Claims, 5 Drawing Sheets

Related U.S. Application Data on Apr. 20, 2015, provisional application No. 62/113,922, filed on Feb. 9, 2015, provisional application No. 62/092,100, filed on Dec. 15, 2014, provisional application No. 62/086,560, filed on Dec. 2, 2014.

(51) Int. Cl.
  *G01F 17/00* (2006.01)
  *G08G 1/01* (2006.01)
  *G06Q 30/02* (2012.01)

(52) U.S. Cl.
  CPC ......... *G06Q 30/0214* (2013.01); *G08G 1/012* (2013.01); *G08G 1/0141* (2013.01)

(56) References Cited

U.S. PATENT DOCUMENTS

| | | | |
|---|---|---|---|
| 2002/0194016 A1* | 12/2002 | Moribe | G01C 21/3697 701/469 |
| 2004/0102898 A1* | 5/2004 | Yokota | G01C 21/3691 701/414 |
| 2005/0031100 A1* | 2/2005 | Iggulden | B60R 16/0231 379/102.03 |
| 2005/0099321 A1 | 5/2005 | Pearce | |
| 2005/0278371 A1* | 12/2005 | Funk | G06F 17/30241 |
| 2007/0109111 A1 | 5/2007 | Breed | |
| 2007/0208497 A1* | 9/2007 | Downs | G08G 1/0104 701/117 |
| 2008/0071465 A1 | 3/2008 | Chapman | |
| 2008/0167800 A1* | 7/2008 | Geelen | G01C 21/3655 701/533 |
| 2008/0255754 A1 | 10/2008 | Pinto | |
| 2012/0123667 A1 | 5/2012 | Gueziec | |
| 2012/0166229 A1* | 6/2012 | Collins | G06Q 40/08 705/4 |
| 2012/0215432 A1* | 8/2012 | Uyeki | G08G 1/096827 701/118 |
| 2013/0325943 A1 | 12/2013 | Al-Harthi | |
| 2014/0191884 A1 | 7/2014 | Maeda | |
| 2015/0179066 A1* | 6/2015 | Rider | G08G 1/04 701/31.5 |
| 2015/0371537 A1* | 12/2015 | Eilertsen | G08G 1/0141 701/117 |

OTHER PUBLICATIONS

Blaine R. Copenheaver, International Search Report and Written Opinion, Jul. 15, 2016.

* cited by examiner

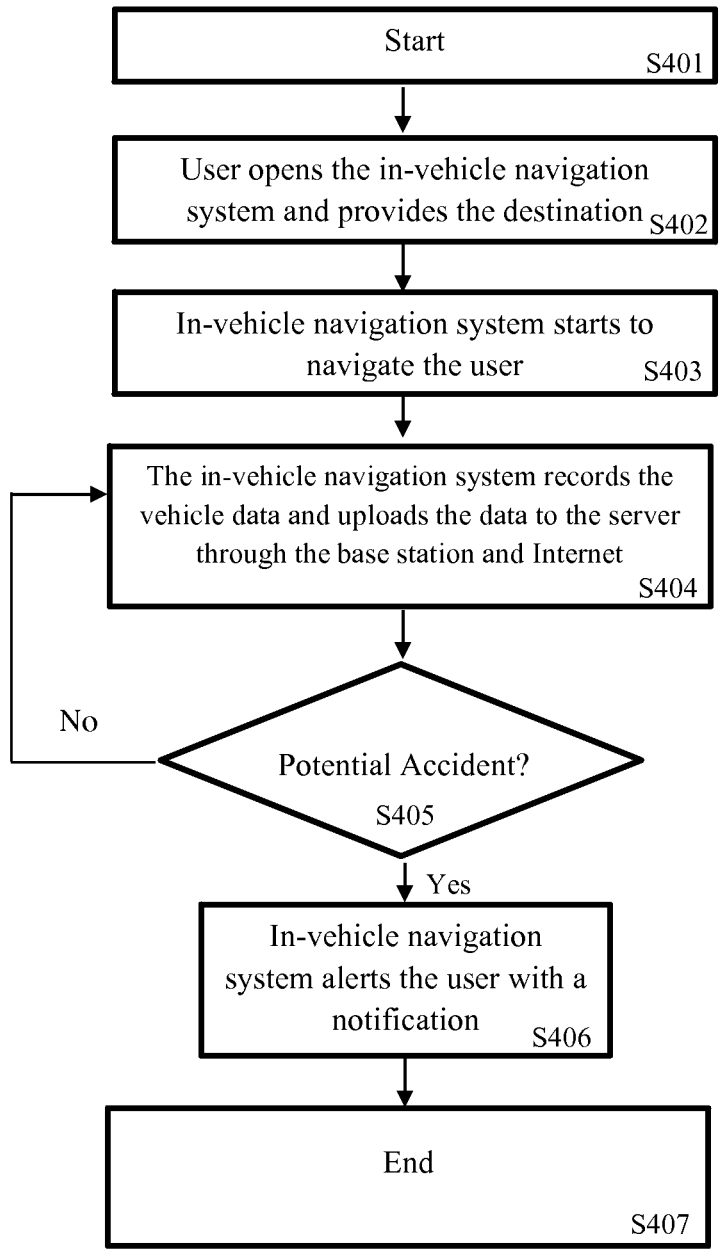

METHOD AND SYSTEM FOR AVOIDANCE OF ACCIDENTS

CROSS-REFERENCE TO RELATED APPLICATION

The present application is based on provisional application Ser. No. 62/086,560, filed on Dec. 2, 2014, provisional application Ser. No. 62/092,100, filed on Dec. 15, 2014, provisional application Ser. No. 62/113,922, filed on Feb. 9, 2015, provisional application Ser. No. 62/150,118, filed on Apr. 20, 2015, and provisional application Ser. No. 62/236,666, filed on Oct. 2, 2015, the entire contents of which are herein incorporated by reference.

BACKGROUND

Technical Field of Invention

The embodiments herein relate to an accidents alert system and, more specifically, to a method and system for alerting the users to avoid accidents.

Description of Related Art

According to the National Traffic Safety Administration (NHTSA), every year vehicle accidents result in averagely 35,000 deaths in the United States. Traffic collisions are the leading cause of preventable deaths in the country. The same source states that U.S. motor vehicle crashes in 2014 cost almost $1 trillion in loss of productivity and loss of life and those, not directly involved in crashes, pay for nearly three-quarters of all crash costs, primarily through insurance premiums, taxes and travel delays. On average, a person dies in a motor vehicle crash every 14 minutes, and a pedestrian dies every 2 hours in the United States.

According to information obtained from NYC Open Data, 128 accidents occurred between July 2012 to June 2015 at an intersection between Main Street and Northern Boulevard in Flushing, N.Y., which is a busy intersection where there are turn limitations on both streets at the intersection. The intersection is prone to accidents because many drivers who are not familiar with the area are trying to make a sudden left turn from Northern Boulevard onto Main Street, which is not allowed as vehicles must turn from a certain designated lane. Vehicles on Main Street must turn left from a certain designated lane to get to Northern Boulevard. However, many drivers also make sudden turns. These sudden turns from both streets result in accidents.

However, accidents may show patterns when they occur along a busy but inherently dangerous street. For example, Canal Street in Chinatown in New York City has many large intersections and many senior citizens trying to cross the street. From August 2011 to February 2014, accident statistics from NYPD Motor Vehicle Collision Reports for several points along Canal Street show a pattern of dangerous accident prone locations along that street. Additionally, in the intersection between Canal Street and Bowery Street, over 267 accidents occurred during this period, which is an average of 8.6 accidents each month. Likewise, in the intersection between Canal Street and Lafayette Street, over 186 accidents occurred during this period, which is an average of 6 accidents each month. Furthermore, in the intersection between Canal Street and Houston Street, over 168 accidents occurred during this period. One of the major current defaults for large intersections is a traffic light that operates at fixed intervals, for example 15 seconds. Many elderly people cannot cross in the allotted time, as a result, they are likely to get hurt or even die while crossing the street as compared to younger pedestrians. Furthermore, pedestrians are a cause for accidents because they do not obey the crosswalk signs when crossing the intersection. Drivers expect that pedestrians will obey the crosswalk signs when crossing, while pedestrians expect that drivers will stop their vehicle when they see pedestrians crossing.

Accidents may show patterns when they involve common participants, for example, bicyclists. The 66th Precinct of the NYPD in Brooklyn contains accident statistics which have been determined to be the area with highest number of accidents in the New York City. The most reasons for these accidents involve bicyclists on the street, which account for over 70% of accidents resulting in injuries. The statistics here show that the area under the 66th Precinct's jurisdiction is one of the most dangerous for bicyclists.

Government inaction and/or delay in taking action for various reasons are factors involved in the occurrence of accidents. Federal, state and city governments have taken various actions or measures in order to reduce the rate of accidents. For example, New York City's administration made reducing traffic deaths a major priority by initiating "Vision Zero" to lower speed limits and crack down on dangerous driving. However, the number of pedestrians killed in 2015 hasn't changed compared to the same period of 2014. Therefore, the city started implementing additional safety measures, such as street redesigns, including notoriously dangerous corridors like Queens Boulevard, in Queens, N.Y. where according to a NYPD Fatalities report from June 2015, 60 people were killed in accidents in 2014. There have been over 185 deaths from accidents alone at an intersection on Queens Boulevard since the 1990's. Likewise, at Roosevelt Ave. and 73rd Street, there have been over 591 accidents from the period of 2009 to 2013, where approximately 36% of people involved were severely injured and 6% of people died. The city government has to wait until 2018 to receive enough funding to completely redesign the above mentioned streets to make these locations safe due to budget limitations. While many areas may be known to be dangerous to the locality, the government is slow to act to rectify these dangers majorly due to funding restraints.

Another instance where the government fails to act are due to established government regulations and standards regarding when a stop sign or traffic light at a certain location is necessary. For example, an intersection located at 138th Street and 31st Road in Flushing, N.Y., is well-known to locals as a very dangerous street with limited visibility to both drivers and pedestrians because the street is slightly curved as can be seen on Google Maps™. The dangers at this intersection has caught the attention of many residents advocating the government to place a stop sign or traffic light at the location due to the public outcry. The area includes over two schools, a daycare, senior center and adult daycare, which necessitates the need for a stop sign or stop light as children and the elderly often cross the roads connecting the intersections. However, the government has failed to provide necessary prevention against future accidents because according to their studies and federal standards, the volume of vehicles, posted speed limits, and volume of accidents do not reach a level to warrant the placement of a stop sign or traffic light.

Currently, there is no effective and similar mobile application in the smart phone, web-based application or in-vehicle navigation system for reducing road/street accidents. In order to obtain the reasons for accidents at specific locations, it is important to compute accident rates which reflect accident involvement by street and other specific locations. Accident patterns can also be discovered through the processing and analysis of available accident data. For example, the frequent statistics regarding the occurrence of accidents along several points on Canal Street in New York City as mentioned above, show a pattern as to the dangers apparent in these specific locations, as well as an overall danger in the area in which Canal Street lies. If the system can analyze and determine these patterns, and will be able to use this processed data to notify users. Thus users who ride bicycles can be notified to avoid areas with a history of a high accident rate involving bicyclists. Bicyclists in the area may avoid the area entirely or receive notifications from the system alerting them to the dangerous locations in the area.

It is also crucial to implement a system where there is no need for reliance on the government's action or spend funding to rectify the street, as the users of exemplary embodiments of the present invention may report accidents, or accident data may be gathered and entered into a system about dangerous areas. The data entered needs to be processed and analyzed to provide notifications to the users to alert them of the potential dangers in specific locations in order to substantially reduce the occurrence of accidents. Thus, there is a need to develop a system to allow the users to report accidents related information about the known, dangerous locations so as to alert others to avoid further accidents.

Furthermore, it is imperative that the gathered accident data be analyzed not just for specific accident locations but for patterns within a certain area which may encompass several locations. Therefore, there is a need for a system and method to collect and analyze accident data for the purpose of sending notifications to educate the users and alert them about accident patterns and precautious measures when in particular locations.

Based on the above mentioned shortcomings, disadvantages and problems, therefore, it is an object of the present invention to provide a method and system for the users to inform or educate them as to the causes of accidents by using historical accident data and real-time crowdsourced data contributed by the users to avoid accidents.

SUMMARY OF THE INVENTION

The primary object of the embodiments herein is to provide a method and a system for providing an assistance to users such as pedestrians, bicyclists, motorcyclists, and drivers to avoid accidents.

Exemplary embodiments of the present invention provide a system and method for identifying the locations of increased danger and inadequate markings or light signals and educate the users.

Exemplary embodiments of the present invention provide a system and method for analyzing accident patterns and alerting users about dangerous road conditions or driving behavior that could lead to an accident and assisting government bodies in gathering vital data required for road improvement and redesigns.

Exemplary embodiments of the present invention provide an alert for the users about potential dangers in the locations with no traffic light signals or stop signs, etc. but large population of children, for example school zone areas.

According to exemplary embodiments of the present invention, the central server further comprises a microprocessor and a server readable program storage medium. The program storage medium is non-transitory and tangible in nature. The program storage medium embodies a program of instructions executable by the microprocessor to search and update historical accident data in a geolocation and assist in avoiding traffic accidents.

According to exemplary embodiments of the present invention, the system comprises a forum module including a general forum for general topics for avoidance of accidents and a specific forum that connects to specific locations for the avoidance of accidents.

According to exemplary embodiments of the present invention, the display apparatus associated with a mobile device unit or in-vehicle navigation system displays a comparison of parking and traffic rules for different countries, states, cities, and municipalities to help the users to avoid accidents during a cross border travel.

According to exemplary embodiments of the present invention, the location identifier is used to identify location of the user and alert the user during the user's presence within a customizable predefined radius of locations with accidents history. The locations with accidents history are identified through different formats, such as colors, shapes, dots, lines and circles, wherein dots, lines and circles are used to identify specific locations. A notification is issued to the user during the user's entrance within the predefined radius of the location with accident history or requests such information through a click of the button on the mobile device.

According to exemplary embodiments of the present invention, the system provides an access to a plurality of third parties APIs comprising a weather related information to identify weather conditions, potentially affecting safety of driving conditions and lead to potential accidents, real-time of trains, subways, buses and other means of transportation at specific locations comprising crossings and stations to alert the users about potential dangers related to approaching means of transportation and an alert triggered for the users related to dangerous conditions and approaching means of transportation.

The method further comprises displaying customizable alerts and notifications and using a forum module to share ideas, raise questions and get answers, concerns, provide and obtain all traffic accidents related information comprising reasons, violated parking and traffic rules and accidents prevention methods.

According to exemplary embodiments of the present invention, the method reduces a possibility of encountering a traffic accident by avoiding accident zones having history of traffic accidents. The accident zones are identified with different formats, for example, shapes or colors based on the category of an instantaneous location of the user. The colors may be displayed on the electronic map and location data is shown over the display module. The accident zones are shown dynamically by the system on an electrical map display. The different formats are used to identify a possibility of getting into an accident based on the location and category of the instantaneous location of the user, a density of accidents at specific locations and a density of accidents for broad as well as narrow geographic area.

According to exemplary embodiments of the present invention, the unified database stores historic traffic accidents data and real-time crowdsourced traffic accident data for different categories of the users. The data processing module cross-correlates an identified current location of a user with a time and a location of each of the accidents to predict a likelihood of an accidents at the user's identified current location, time and date.

According to exemplary embodiments of the present invention, the analysis algorithm will be used to analyze and cluster the data from unified database and will be verified by a verification algorithm.

According to exemplary embodiments of the present invention, a monetary reward is credited when users contribute to the system's accident data through reporting and receiving ratings from other users with firsthand experience.

An amount of the monetary reward is determined by an administrator, wherein the monetary reward is provided on achievement of a predetermined number of positive endorsements or rating.

According to exemplary embodiments of the present invention, the method identifies big size commercial vehicles comprising trucks and trailers. The method is used to alert the users more likely to get into accident comprising the users with little driving experience, motorcyclists, bicyclists and pedestrians about approaching big size commercial vehicles, inform the users about the routes of commercial vehicles. The routes of commercial vehicles may be identified by colors, or other formats.

According to exemplary embodiments of the present invention, a forum module contains two aspects: a general forum and a specific forum. The general forum module is for users to discuss and obtain information on general topics on how to avoid accidents. The specific forum is connected to specific locations where there are accidents and will indicate the specific reasons for these accidents at the locations. The general forum and specific forum connect with each other.

This summary and other aspects of the embodiments herein will be better appreciated and understood when considered in conjunction with the summary and following description and the accompanying drawings. It should be understood, however, that the following descriptions, while indicating preferred embodiments and numerous following specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 4 is a flowchart that illustrates the workflow of how an in-vehicle navigation system works, according to exemplary embodiments of the present invention.

DETAILED DESCRIPTION OF THE DRAWINGS

Figure 1A:
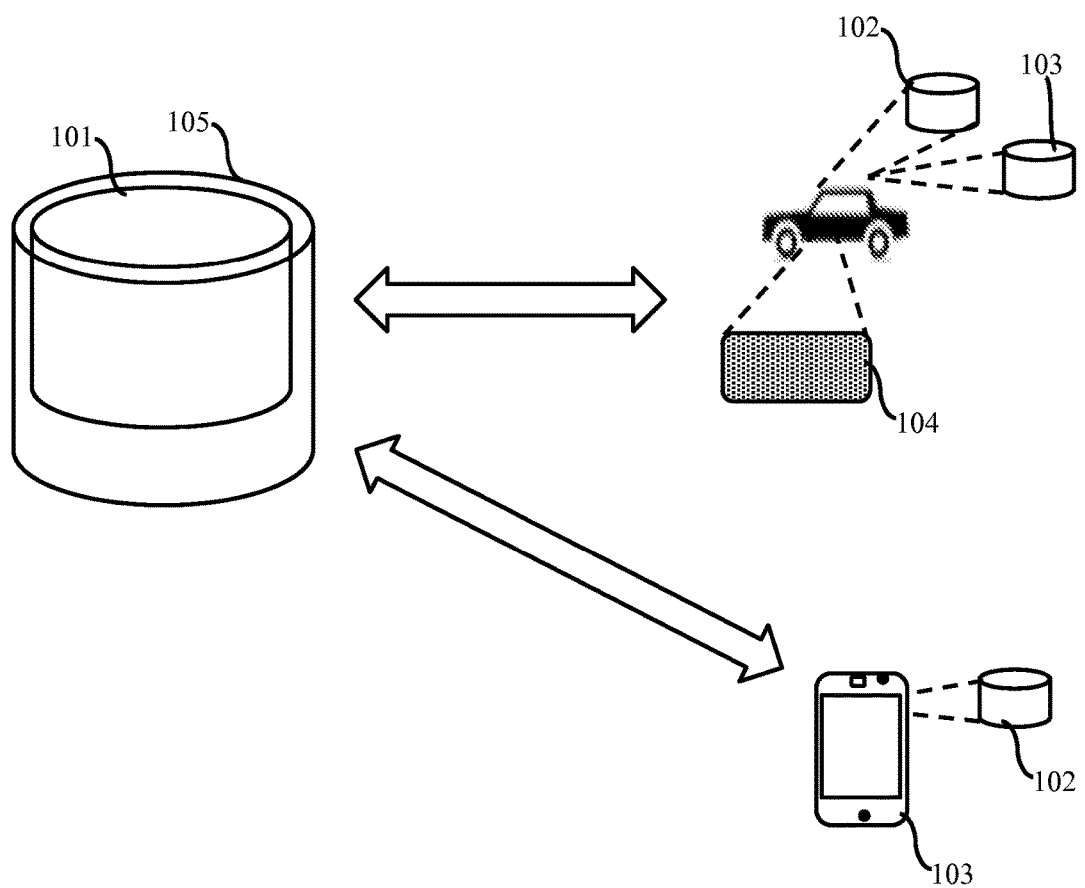
FIG. 1A illustrates a diagram of the system for mapping and storing traffic accidents and alerting a user of traffic accidents, according to exemplary embodiments of the present invention.

In the following detailed description, in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner. Although the invention may be described herein with reference to a modern metropolis such as NYC as the main example for implementation, the system and method is applicable worldwide. The term "user(s)", is intended to encompass not only driver(s), but other individuals, for example motorcyclists, bicyclists or pedestrians. The terms traffic collision, also known as a motor vehicle collision, traffic accident, motor vehicle accident, car accident, automobile accident, road traffic collision, road traffic accident, wreck, car crash, or car smash may be used interchangeably. The vehicle accident occurs when a vehicle collides with another vehicle, pedestrian, motorcycle, bicycle, animal, road debris, or other. The invention may assist the users in avoiding accidents by alerting them of the potential dangers through real-time notifications based on historical accident data analyses. The real-time notifications may contain not just alerts but other background information, for example the reasons for the accident and how to avoid accidents, from the historical accident data and/or real-time crowdsourced data.

According to exemplary embodiments of the present invention, the system and method integrates an electrical/digital map (e.g. Google Maps™) on the mobile device. The roads and routes are displayed from the map database and are presented with the analyzed data related to the location and relevant information in an easily understandable manner by the user.

The system and method of the current application may help the users and government bodies lowering fatal accidents and crashes by analyzing these dangerous areas and educating the users by various means, such as pictures, videos, comments and suggestions about accident reasons and prevention thereof. Accidents may be caused by multiple factors which may be common patterns or isolated incidents. In either case, knowledge of the original causes of previous accidents may help prevent future similar accidents. Problematic and accident prone areas may result from an expectation from either party involved, for example, the driver or the pedestrian to proactively act by themselves to avoid an accident. This assumption by either party causes the accident as they both assume the other party is trying to be safe and avoid a potential accident. The goal of the present inventions is to help the users understand the causes of accidents, and therefore help to learn preventative measures for accidents.

Exemplary embodiments of the present invention also differentiates between the four main collision types: regular-sized vehicle-vehicle, vehicle-pedestrian, vehicle-bicycle, and large-sized commercial vehicle-vehicle.

According to exemplary embodiments of the present invention, the location identifier is a Global Positioning module installed in a mobile device. The location identifier is wirelessly connected to the unified database and the data processing module. The mobile device comprises an internal clock mechanism to identify current time and date.

According to an embodiment herein, the location identifier is a Global Positioning System (GPS) navigation device installed in a vehicle. The location identifier is connected to the data processing module through either a wired or a wireless medium.

According to an embodiment herein, the unified database stores a plurality of parking and traffic rules, violation codes, historical traffic accident data and real-time crowdsourced traffic accident data. The traffic accident data includes a variety of sub-data, such as geolocations, reasons, time and date of the accident, category of accident, number of vehicles and people involved, such as age, gender, etc.

According to exemplary embodiments of the present invention, the data processing module cross-correlates an identified current location of the users with time and location of each of the accidents and parking and traffic rules to alert the user about accident prone locations according to the category to which they belong.

According to exemplary embodiments of the present invention, the processing module further transmits accident information over the display apparatus. The accident information comprises a plurality of accident reasons and accident locations availed from the unified database for current location of the user. The accident database comprises accident locations and a category of the users who use the application comprising commercial vehicle users, non-commercial vehicle users, motorcyclists, bicyclists and pedestrians.

According to exemplary embodiments of the present invention, the location identifier is used either in an in-vehicle navigation system or a mobile device. The mobile device and the in-vehicle navigation system includes one or more speech recognition modules.

According to exemplary embodiments of the present invention, the forum module allows a plurality of the users of the one or more mobile device units to use the general forum and specific forum to exchange information and share ideas about traffic accidents and avoidance thereof. The forum module is configured to connect the general forum and specific forum. The specific forum will organize content according to specific locations of traffic accidents. The general forum will contain content which includes a general discussion area for allowing the users to share and exchange information and ideas about traffic accidents and avoidance thereof. The forum module for the specific forum will also gather questions, answers and comments about traffic accidents at specific locations, organize content to clarify reasons of traffic accidents, provide recommendations and share ideas, photos, videos, and provide comments on how to avoid traffic accidents and provide a street view function with photos or videos for locations with patterns of traffic accidents when a number of the traffic accidents reaches a predetermined threshold number.

According to exemplary embodiments of the present invention, the forum module is connected to the location of accidents to obtain information about accidents at specific locations, provide and share general information in regards to accidents and avoidance thereof not connected to specific locations and to share ideas, raise questions, concerns, provide and obtain information in regards to accidents and avoidance thereof.

On receipt of the reported information, the system processes and analyzes the information subject to verification in order to store the information into the database for the purposes of providing notifications to alert the users. The information is also gathered and input into the database from various sources, for example, newspapers, websites, television reports, etc. The system acts as a supplement to government standards since actions to substantially prevent future accidents are implemented immediately as the government is slow to act or may not act at all. The real-time accident reporting and historical accident database maintained by the system keeps a unified database complete and up-to-date as well as advise the users in real-time about roads and locations where they may encounter accident related lane closures or heavy traffic delays.

According to exemplary embodiments of the present invention, the system further comprises the external and internal sensors to identify the big size commercial vehicles. The unified database comprises images of the identified commercial vehicles.

According to exemplary embodiments of the present invention, the unified database stores historical records of accidents and real-time crowdsourced records of accidents. The unified database is populated by receiving the historical records from an official source for example, government websites, receiving the real-time crowdsourced records from a plurality of the users, verifying an accuracy of the received historical and real-time crowdsourced records and removing a duplicate accident data from the received historical and real-time crowdsourced records.

According to exemplary embodiments of the present invention, the data in the unified database is divided into different categories of accident participants further comprising non-commercial vehicle users, commercial vehicle user, motorcyclists, bicyclists and pedestrians. Each category of the users accesses information about accidents relevant to an interested category and an interested location. An alert is issued in advance during an approach of the users to the interested location with accident history for the category of the user.

According to exemplary embodiments of the present invention, the display apparatus associated with a mobile device unit displays a comparison of parking and traffic rules for different countries, states, cities, and municipalities to help the users to avoid accidents during a cross border travel. Since violation of the parking and traffic rules may lead to accidents, a comparison of the relevant rules is necessary to notify users of the differences between the rules of their current location and those of the location from the user's driver license so as to avoid violating parking and traffic rules which easily result in accidents. The comparison is made based on the identified current location of the user and a location obtained from the user's driver license stored in a user profile. An information obtained from the user's driver license indicates a country, state and city, the stored parking and traffic rules are summarized, compared and analyzed to alert the user of differences between parking and traffic rules of the country, state, and city of issuance of the user's driver license and the determined location of the user. The differences between the parking and traffic rules are displayed on the mobile device unit.

According to exemplary embodiments of the present invention, the location identifier is used to identify location of the user and alert the user during the user's presence within a customizable predefined radius of locations with accidents history. The locations with accidents history are identified through different formats, such as colors, dots, lines and circles, wherein dots, lines and circles are used to identify specific locations, narrow areas as streets or broader areas as blocks. A notification is issued to the user during the user's entrance within the predefined radius of the location with accident history or requests such information through a click of the button on the mobile device.

According to exemplary embodiments of the present invention, the system integrates with a third party API comprising a weather related information to identify weather conditions, potentially affecting safety of driving conditions and lead to potential accidents and alert the user in advance for an essential vehicle maintenance and parts replacement.

The system integrates with third party APIs, comprising of a schedule of real-time of trains, subways, etc. at specific locations comprising crossings or other intersections to alert the users about potential dangers related to approaching means of transportation and an alert triggered for the users related to dangerous potential accidents.

According to exemplary embodiments of the present invention, the system identifies dangerous locations comprising intersections and streets having no stop signs and signal lights. An information about the dangerous locations are collected from government agencies such as the Department of Transportation, and other sources of open data from government agencies, various informational sources comprising newspapers, social media, blogs, etc. and supplemented by user's reports and the administrator of the system. The dangerous locations' information resides in the central server of the system.

According to exemplary embodiments of the present invention, the method reduces a possibility of encountering a traffic accident by avoiding accident zones having history of traffic accidents. The accident zones are identified with different formats, such as shapes or colors based on the historical accident data. The colors are displayed on the electronic map and location data is shown over the display module. The accident zones are shown dynamically by the system on an electrical map display. The different formats are used to identify a possibility of getting into an accident based on the location and category of the instantaneous location of the user, a density of accidents at specific locations and a density of accidents for broad as well as narrow geographic area. The density comprises a plurality of locations with higher number of accidents identified by darker colors compared to locations with lesser density of accidents identified by lighter colors.

According to exemplary embodiments of the present invention, the unified database stores historic traffic accidents data and real-time crowdsourced traffic accident data for different categories of the users. The unified database further stores traffic accident data including geolocations, reasons and time and date of the traffic accidents. The data processing module cross-correlates an identified current location of a user with a time and a location of each of the accidents to predict a likelihood of an accidents at the user's identified current location, time and date. The accident information comprises a plurality of reasons, accident locations availed from the unified database for current location of the user or for a location requested by the user. The accident information comprises a category of the user.

According to exemplary embodiments of the present invention, the method provides accidents alerts combined with a route planning mode through a GPS navigation device or a mobile device. The accident alerts comprises retrieving accidents data from the unified database and providing advisory accidents alerts for the user along the route and suggesting a route to the user to an intended destination with least amount of accidents based on the preferences of the user.

According to exemplary embodiments of the present invention, a method further comprises the method for alerting a user to avoid accidents comprising comparing similar weather conditions indicated by the data pertaining to the historical accidents data related to forecasted weather conditions to obtain potential weather-related accidents information. The method for alerting a user further comprises obtaining pothole information and dangerous location information from unified database and displaying the relevant data to alert the user.

According to exemplary embodiments of the present invention, the method identifies the dangerous locations comprising intersections, streets, and other ideas that have many accident occurrences. The dangerous locations have no stop signs or signal lights or other identification marks. The dangerous location information is used to alert the users about the dangerous locations and inform about increased possibility of the accident at such dangerous locations.

According to exemplary embodiments of the present invention, a reward is credited for users who report new accident data for a specific location, which includes the date, time, location, reasons, how to avoid an accident and other related information about the accident. The report is subject to ratings from other users who have firsthand experience. Firsthand experience is determined by a verification algorithm that identifies whether the user has passed by the locations with accidents depending on their geolocation history. If the positive ratings reach a certain threshold level, then the system may reward the user who submitted the initial report.

An amount of the reward may be determined by an administrator, wherein the reward is provided on achievement of a predetermined number of positive endorsements or rating. The various other rewards are provided on achievement of the predetermined number of positive endorsements or ratings.

According to exemplary embodiments of the present invention, the method identifies big size commercial vehicles comprising trucks and trailers. The method is used to alert the users more likely to get into accident comprising the users who are drivers, motorcyclists, bicyclists and pedestrians about approaching big size commercial vehicles, inform the users about the routes of such commercial vehicles. The routes of trucks or trailers may be identified by colors or other formats. The darker colors are used to identify routes of big size commercial vehicles with history of many accidents and lighter colors are used to identify routes with history of lesser accidents. The settings to receive alerts and notifications are changed as per user preferences. The user preference comprises alerts and notifications are either repeated for a preset number of times and shut down and customized distance, time, and form for receiving alerts and notifications comprising as voice, text, SMS or a combination of them.

The vehicle-pedestrian rollovers are the second most common type of accidents. According to statistics from National Vital Statistics System (NVSS), older adults and children are the most at risk for vehicle-pedestrian collisions. The higher vehicle speeds increase both the likelihood of a pedestrian being struck by a vehicle and the severity of injury. For older adults, the majority of non-fatal injuries are the result of an older adult falling or being hit by a motor vehicle.

Another example of common accidents is collision of bikes with vehicles at intersections. Although the intersections represent a relatively small portion of a cyclist's travel route, they are where a cyclist is most at risk of getting hit by a vehicle or otherwise involved in a vehicular accident. 11% of the bicycle accidents involve a collision with a vehicle and of these, 45% take place in intersections. In order to minimize the risk of intersection accidents with vehicles, the cyclists need to understand the rules of the road, learn to recognize some of the most dangerous intersection hazards, know the accident patterns at specific locations along their route and take safety precautions when approaching and riding through an intersection. The frequent statistics regarding the occurrence of accidents along several points on a particular street may show a pattern as to the dangers apparent in these specific locations, as well as an overall danger in the area in which the particular street is located. The system will process the related bicycle accidents data and may discover patterns within certain locations. Users who are bicyclists may be alerted to these certain locations and can avoid such accidents or can avoid such locations and intersections where the data shows many accidents with bicyclists involved.

The fourth important accident type is collision involving commercial vehicles. The commercial trucks present unique dangers to other vehicles, pedestrians, motorcyclists, bicyclists and their passengers. Not only do truck drivers need to be aware of the dangers presented by their large and unwieldy vehicles, but other drivers also need to use extra caution in their presence. There is also the existence of accident dark spots, which may not be currently known by a majority of the people but may have accidents occur at the location due to its inherent dangers. The most common type of unsafe act committed by the drivers who get in collisions with large trucks has to do with ignorance of a truck's performance capabilities, such as limits associated with acceleration braking and visibility. The common unsafe acts committed by vehicle drivers in the vicinity of large trucks, which often result in truck accidents, include: Driving in the "No-Zones"—the areas behind and beside a commercial truck where the truck driver has limited or zero visibility; changing lanes abruptly in front of a truck; driving to the right of a truck that is making a right turn; misjudging an approaching truck's speed at an intersection, and making a left turn in front of the truck; merging improperly into traffic, causing a truck to maneuver or brake quickly; failure to slow down or speed up when a truck begins to change lanes or merge; unsafe passing, particularly passing with insufficient headway; passing a truck, then being blown out of position by air turbulence or cross-wind; pulling into traffic from the roadside in front of a truck without accelerating sufficiently; driving between large trucks; abandoning a vehicle in a travel lane, or failing to get a disabled vehicle completely off the highway and onto the shoulder, etc. Exemplary embodiments of the present invention may utilize internal and external cameras or sensors, as well as historical and real-time data from unified database to inform the users about approaching commercial vehicles, accident patterns involving commercial trucks at specific locations and issue precautionary alerts to prevent future accidents.

Thus, the users will be able to see information pertaining to locations and category they belong to, which may be pedestrians, non-commercial vehicle users, commercial vehicle users, bicyclists, or motorcyclists. However, the user may change the category depending on their situation to view customized notifications. For example, the users who select pedestrian because they are currently walking on the street may receive notifications on their mobile communications device alerting them to the locations with high accident activity involving pedestrians. The system may cluster the data according to the categories of the users and provide more accurate notifications according to the user group. At the same time, if the users are interested in receiving alerts for any other group, they will be able to indicate that in settings of the system and access information of any of the categories of their interest.

According to exemplary embodiments of the present invention, the present invention connects internally with various functions of a mobile device or in-vehicle navigation system that include but are not limited to an internal clock mechanism, a phone call function, a microphone, a GPS tracking for geolocation mapping (latitude and longitude coordinates), and/or camera, etc. A mobile application running on the mobile device and utilize resources which includes a microprocessor, a memory, a GPS, a wireless connection and a display. The notifications are accomplished through one or more media such as the visual display or audio system, etc.

Also, before a user starts to drive to his or her intended destination, the system may assist the user in advance by integrating with a third party API to retrieve weather information in order to determine whether the system should send reminder notifications to alert the user to do a general check of the vehicle, for example. Through a third party API, the system may monitor the weather conditions and alert the User before a forecasted snowstorm to check the brake fluid or replace the windshield wipers, if such replacement is needed based on vehicle's identified mileage or time since last replacement. The notifications may also alert the user to check their tires in addition to other vehicle components depending on the type of weather forecasted. If the user determines that a vehicle component needs to be changed, for example the windshield wipers, then the system may use the digital map feature to identify the current location of the user and then display location information of the closest maintenance or repair shop. Maintenance or repair shops may register their store information with the system to be included in the digital map. Store information may include but not be limited to address, hours of operation, phone number, and supply stock information, etc. Alternatively, the system's integration with a third party weather API may also be used to alert the user about weather condition changes and adjustments in the driver's behavior required to help prevent accidents. For example, when there is rain, snow, sleet, or any other type of precipitation that makes driving more difficult, the users should be adapting.

In relation to vehicle maintenance, the mobile application may also sync with real-time updated weather forecasting through a third-party API. For example, depending on the weather conditions such as when it may rain or snow, the mobile application may automatically remind the vehicle owner or driver by notifying them to check their windshield wipers, tires, and turn on their headlights. Any type of hazardous conditions may trigger the mobile application to send out customized notifications to the user. When the mobile application sends a notification about the weather conditions with reminders, the notification may also include information on the locations of stores, their distance (i.e. which is closest), the working hours, phone number, and the prices of the items the user may need. Such information may also be retrieved by simple click of the button depending on the users' location. Third-parties who would like to be included in this function may register all relevant information with the system of the mobile application. The system may keep an updated database of all locations which register their information. The system of the mobile application may be able to research the weather conditions at the time of the report by the user. For example, when the weather forecast reflects it may rain, the mobile application may send a notification to remind the owner to check their windshield wipers, check their vehicle lights to make sure they are operating properly, etc. For snow situations, the mobile application may send a notification to the user to remind them to check their tires, etc. Precautionary notifications may ultimately help prevent accidents. The notification may show information on the locations of stores and the user can see which store is the closest, the prices of the items in the store, the phone number and the working hours of each store. The users may also use the forum function to read reviews about the service locations or maintenance shops, see pictures and locations of locations, connect to such registered locations to see the service waiting time, availability of replacement parts, prices, warranties, etc.

Exemplary embodiments of the present invention provide a method to build a unified database of accident locations, traffic and parking rules according to the type of vehicle and type of plate, traffic and parking violation that may lead to accidents, as well as database of potholes and other road defects that could lead to accidents. The method comprises collecting and storing information related to accidents and updating accident information in real-time. The accident related information includes but is not limited to: date, time, borough, zip code, latitude, longitude, location, street names, vehicle types, reasons, ages, number of pedestrians injured/killed, number of cyclists injured/killed, number of motorists or drivers injured/killed, street direction, street type, surface condition, surface type, road condition, road type, alignment, weather, lighting etc. If the database has some of the important information missing, such as for example, reasons of the accidents, such information may be provided by the users through reporting the accidents with full details through a forum module connected to the specific locations where the accident occurred. The users can vote within the specific forum from a list of reasons to identify the reasons of the accidents if the reasons for accidents are not clear or not identified, whereas only the users with firsthand experience of the accident location or the users within a specific radius of the accident location may be allowed to vote. This way, the system will identify the users with direct or indirect knowledge of the accident location, which will provide more credibility to identification of the accident reasons.

The unified database may include historical accident data processed from various sources that include, but are not limited to the government or government websites, government agents, such as Police Department, law enforcement, Department of Transportation, TV, radio, various social media, municipalities, non-government organizations (NGO's), private entities, community organizations, interested individuals or users, websites containing useful information such as law enforcement abbreviations, blog posts, social networks, newspapers, professional articles, publicly available sources, and any other resources where historical accident-related data can be collected etc. (hereinafter, "Informational Sources"). TV and radio are important sources of up to date credible information and accident locations. In television or broadcast journalism, news analysts examine, interpret, and broadcast news, either videotaped or live, from on-the-scene reporters, thus credible information may be received faster than through government websites or the users' reports. Data may be obtained by the system through the precinct's website and subsequently stored in the database to be analyzed for patterns. Some of the vehicular accident data sources are: Insurance Institute for Highway Safety, Highway Loss Data Institute, National Highway Traffic Safety Administration, U.S. Department of Transportation, data collection websites, newspapers, articles, blogs, etc. For example, the Taxi and Limousine Commission and its affiliated agencies in New York City releases articles on their official website and periodicals such as a magazine from time to time which feature accident information or accident data. Some of the accident data may also be provided as public open data from the government agencies and may also be available through a request from the Freedom of Information Act if not available through public government websites. Websites created by communities or interested individuals may also contain relevant accident information and how to avoid accidents. The Administrator of the system, employees, or third party contractors may be hired to search, gather, and input accident information from these various sources into the unified database.

However, when no open government accident data is available for specific location, the system may obtain historical accident data through the input from the users and/or interested individuals and an Administrator of the system may also collect accident data from private entities. The database may utilize a system and method for collection of information regarding accident from the Informational Sources. Other information from newspapers, blogs, magazines, etc. may be collected and summarized by an Administrator or employee of the system to supplement the database. This collected accident data may also be supplemented by real-time crowdsourced accident information from the users, and users may report any real-time accidents to the unified database. Examples of the crowdsourced data aside from accident locations may include information about improper coning off of construction zones. In many cases road construction crews fail to safely cordon off construction zones resulting in an increased probability of auto accidents. To reduce the probability of these types of accidents crowdsourcing may be used where user report the coning information in real-time.

These data collected is properly analyzed to retrieve the following purposes: identification of location points at which unusually high number of accidents occur; detailed functional evaluation of critical accident locations; development of procedures that allow identification of hazards and alerting the users before accidents occur; development of different statistical measures of various accident related factors to give insight into general trends, common casual factors, driver profiles, etc. The purpose of the analysis is to find the possible causes of accidents related to drivers, vehicles, and roadways. Accident analyses are made to develop information such as: driver and pedestrian—accident occurrence by age groups and relationships of accidents to physical capacities; vehicle—accident occurrence related to characteristic of vehicle, severity, location and extent of damage related to vehicles; roadway conditions—relationships of accident occurrence and severity to characteristics of the roadway and roadway conditions.

Exemplary embodiments of the present invention may collect and analyze all relevant users' information, including but not limited to gender, age, education, ethnicity, occupation, etc. These data may be used for statistical purposes, for example, to infer information which types of accidents are relevant to a specific age group, ethnicity, time of the day, day of the months, etc. For example, according to the Insurance Institute for Highway Safety, young drivers between 15-20 years of age tend to get into accidents after 8 pm more than during a daytime, whereas for the senior drivers of age 65 and up possibility of getting into accident increases up to 30% in a winter time.

Exemplary embodiments of the present invention provide various methods and systems for tracking when and where accidents have occurred and alerting users of their proximity to such locations on their approach. In this way, exemplary embodiments of the present invention may save users by avoiding accidents while helping to ensure safer roadways and help preserve the normal flow of traffic.

Government data may be available through the applicable authority's website and/or publicly accessible open data. Although locations from government data regarding accident information are not as accurate as geolocation coordinates, it is still useful because it provides accident data in the major parts that are credible and resourceful even though it is incomplete, not updated in a timely manner, and contains errors, etc. Therefore, locations from government accident data may be transformed to geolocation coordinates through various third party software, e.g., Smarty Streets.™, before the accident location data is input into the database of the system. Government databases for accidents may also be incomplete and deficient due to the lack of data regarding specific reasons and/or other relevant information due to privacy, protective purposes, and/or determining legal fault purposes. There is a need for users to be able to have up-to-date real-time traffic information quickly shared with other users so that users can avoid accidents. Thus, it would be beneficial to provide improved techniques for obtaining and analyzing accident data with sufficient details to provide current traffic road conditions and the reasons for the accidents. This leads to reducing risky user behaviors, prevention of vehicle accidents, and overall road safety. Exemplary embodiments of the present invention may collect data concerning accidents and may use this data to provide users with accurate and effective notifications on the reasons behind previous accidents in certain locations. The data collection of the accidents is primarily done by law enforcement. The user's0 accident reports are secondary data which are provided by the users themselves. The collected data may include various parameters, for example: general—date, time, person involved in accident, classification of accident like fatal, serious, minor, etc.; location—description and detail of location of accident; details of vehicle involved—registration number, description of vehicle, loading detail, vehicular defects; nature of accident—details of collision, damages, injury and casualty; road and traffic condition—details of road geometry, surface characteristics, type of traffic, traffic density etc.; primary causes of accident—details of various possible cases which are the main causes of accident; accident cost—financial losses incurred due to property damage, personal injury and casualty.

In addition to digital maps, exemplary embodiments of the present invention may utilize variety of colors, shapes, or other formats to illustrate locations prone to specific types of accidents. The statistical analysis of accidents is carried out periodically at critical locations or road stretches which may help to arrive at suitable measures to effectively decrease accident rates. The measure is the number and severity of accidents. These statistics reports are to be maintained zone-wise. Accident prone stretches of different roads may be assessed by finding the accident density per length of the road. The places of accidents are marked on the map and the points of their clustering are determined. By statistical study of accident occurrences at a particular road or location or zone for a long period of time it is possible to predict with reasonable accuracy the probability of accident occurrence per day or relative safety of different classes of road users in that location. Each zone is assigned a color and/or shape to differentiate accident prone zones in real-time. This differentiation may be a dynamic process changing according to several parameters, such as, for example, time of the day and a group of risk that the user belongs to. For example, the users that are identified to belong to a "High Risk Driver Group" may see a "red zone" on their mobile device while approaching specific location, meaning that possibility to get into an accident in that location is high for these users. Whereas some other users belonging to a "Low Risk Driver Group" as identified by the system, may see an "orange zone" alert for very same location, meaning that their probability of getting into accident in that location is moderate. The system may classify the users to different risk groups based on their age, education, occupation, history of prior accidents and violations, as well as other actuarial parameters.

A user's location may be indicated on the electrical map with a circle radius surrounding the user's location which will move on the electrical map in correspondence with the user's movements. The circle's color may change depending on the frequency of accident data and/or risk level available for the current location as the user moves. However, when the user leaves the applicable area with frequent accident data and/or risk level, the circle surrounding the user's location may disappear to indicate that the high level of accidents or risk level no longer exists.

In a similar way, the different formats for example, colors may be used to identify density of accidents at specific locations. For example, the density comprises locations with higher number of accidents marked by darker colors compared to locations with lesser density of accidents. The formats may further identify a density of accidents by enlarging to shrinking for a broad or narrow geographic area, for example, a borough, block or street, etc. The accidents themselves may be identified by different colors and shapes.

Exemplary embodiments of the present invention, the present invention uses different formats such as color(s) to indicate certain information/data and/or to differentiate certain information/data. However, it is to be understood that the use of color(s) is not limited, as other formats (e.g. dots, lines, shapes, pictures, and categories, etc.) may be used in the place of colors to indicate certain information/data and/or to differentiate certain information/data, For example, accident at a specific location may be identified by dot, whereas accident prone streets and blocks identified by lines and circles, respectively. The users may be able to choose their interest zone, may it be specific location, street or entire block to see the number of accidents at their interest zone and its relative safety.

Exemplary embodiments of the present invention may analyze the comprehensive database for statistical patterns regarding accidents at certain locations where the data is available.

Exemplary embodiments of the present invention may also provide a system and method for the provision of a precautionary alert wherein a server is configured to send a notification to a mobile device or a navigation system when it indicates the user is traveling towards a location with previous accidents. An accurate database of the system may be used to provide an understanding of all the rules applicable to their surroundings, which may result in the reduction of accidents.

The potential user may be asked to register with the service by providing driver's license pertinent information such as their name, email address, plate information such as type of plate, type of vehicle, the state/country issuing the driver license to create a user ID for each user of the mobile application. Other user's information, such as age, level of education, occupation, ethnicity and marital status, if such can be provided by the user, will be required as well, since this type of information holds actuarial significance and is used for calculation of probability of the specific user of getting into an accident. The user IDs are also necessary for the purposes of tracking reports and ratings made by each user. Credit card and/or debit card information may also be requested for subscriber fees or services fees for certain services the mobile application provides for a certified user. Certified users may be allowed to use various features of the mobile application which includes but is not limited to reporting information and rating information.

Exemplary embodiments of the present invention may crowdsource information about accidents that were reported by the users and/or collected by the Administrator of the system. Crowdsourcing is a distributed problem-solving method that utilizes online and offline resources to compile services, ideas, and/or content by the solicitation and/or capturing of data from a variety of people native to a special community that is targeted by the crowdsourced subject. Crowdsourced information may be used in gathering data that is current, updated, and readily available in real-time in order to provide firsthand information through personal knowledge and/or experiences. Crowdsourcing is also effective in gathering information not provided by government data. Crowdsourcing information may update, supplement and verify the Unified Database by using information as reported by the users or collected by the Administrator of the system. The system may use incentives where rewards may be given to encourage user reports to update and supplement the system.

For the purpose of crowdsourcing accidents related information, the system may include a central computer system connected to the Internet and the plurality of mobile devices capable of determining their geographic locations according to geolocation and transmitting accident related information into the central computer system. The central computer system continuously maintains the Unified Database of crowdsourced data along with data received from various Informational Sources, analyzes user reports, detects patterns for locations or possible accidents, and provides real-time alerts to a plurality of users connected to a network through their mobile communications devices. The Unified Database may comprise information in regards to the users and accident causes. Accident causes may include but is not limited to: excessive speed and rash driving, violation of parking and traffic rules, failure to perceive traffic situation or sign or signal in adequate time, carelessness, fatigue, alcohol, sleep etc.; vehicle—defects such as failure of brakes, steering system, tire burst, lighting system, etc.; road conditions—skidding road surface, potholes, ruts, etc.; road designs—defective geometric design like inadequate sight distance, inadequate width of shoulders, improper curve design, improper traffic control devices and improper lighting, etc.; environmental factors—unfavorable weather conditions like mist, snow, smoke and heavy rainfall, etc.; and other causes—improper location of advertisement boards, gate of level crossing not closed when required etc. Each input may be assigned a unique tracking number and this unique number may be transmitted to the remote server accompanied by the current position of the user/mobile phone.

Exemplary embodiments of the present invention may promote transparency and accuracy for accident prevention in utilizing combined raw data from various sources by creating a database and platform for the users to access collected information in a user-friendly, mobile device application interface. To build the Unified Database, raw accidents data may be obtained from Informational Sources which may be uploaded to a computer microprocessor and formatted to include only relevant information needed for running analyses and providing notifications. The uploaded accident data may be then split into two sets for cleaning and uploading into the system's server. The first set may be accidents data which is already verified as having all the necessary information in the right format while the second set may be accidents data which needs to be reformatted to include all the necessary information. Once all accidents data has been cleaned, the address data may be extracted in a data frame to be used in a third party geocode API, for example, Google Geocoding API™, or SmartyStreets™, to output a .csv file with all the geocoding information of locations relative to each accident. The output may be reviewed and corrected by the Administrator of the system for accuracy and completeness. Signs data and rules, regulations, laws and codes (RRLC) data files may also be uploaded, cleaned and merged with the accident data into the Unified Database.

The raw data entered, processed, stored, and analyzed may include but is not limited to: the type of accident; the causes/reasons for the accident; date and time of the day; Registration State; Plate Type; Vehicle Type; Issue Date; House Number; Street Name; Law Section; and/or any other relevant factors, etc. Reasons for accidents include but are not limited to: distracted driving, drunk driving, speeding, running red lights, running stop signs, teenage drivers, marking or signs design defects, etc. These reasons may be used to generate applicable alerts for the users at the specific location and may be used as an option for users who have firsthand experience to vote for the reasons for accidents if such reasons are not clear in the original accident report.

The system may integrate algorithms to detect duplicate data if accidents reported by the users match those in the database may be labeled as duplicate data, which may be automatically rejected. However, accidents data not included in the database may be added to the historical database and notifications will be updated to properly reflect added data to properly alert the users with updated information.

The database may also include other types of publicly available useful and critical resources, for example, violation and insurance codes, vehicle damage codes, abbreviations and their common meanings as used by law enforcement. Law enforcement officers often use abbreviations when writing accident report. On the report, the abbreviations may appear in the area where the officer specifies the accident location and reason of the accident. Abbreviations may be processed and stored in the database by gathering data from publicly available sources to provide the most accurate and up-to-date meanings.

The system may include a user profile database configured to store user information and associations between each user and their mobile device after registering. Once registered, the users may set and change their information in their user profile if necessary. Settings that may require a user's input or preference may be subsequently changed by the user within the settings of the mobile application (e.g. on/off). For example, the user may change the type of vehicle they are currently driving in the case they switch vehicles if necessary. Accordingly, this is also applicable to the type of plate associated with the vehicle. Additionally, the users who do not possess a vehicle may still be able to select and/or change their vehicle type or plate type in order to receive information from the system. The system of the mobile application may recognize four categories of users: pedestrians, bicyclists, non-commercial vehicle users or commercial vehicle users. These four categories may be further separated into sub-categories, for example, commercial vehicles may be distinguished into larger sized commercial vehicles such as trucks and regular sized commercial vehicles. Pedestrians and bicyclists are included because they are one of the many reasons for accidents. Bicyclists are subject to parking and traffic rules but may not follow them, which results in accidents. Pedestrians may jaywalk, which results in accidents. These four categories are necessary to provide comprehensive system for alerting all parties who may be involved in dangerous accidents.

Since different RRLC may apply to non-commercial and commercial vehicles resulting in different types of ticket violations which may be categorized in the system, the users who indicate in their profile that they drive a commercial vehicle may be automatically marked in the different category for only commercial vehicles. Non-commercial vehicles may include but are not limited to: passenger cars, mini-vans, SUVs, etc. Within the commercial vehicles database of the system, the type of commercial vehicle may be split into categories, which may include, but are not limited to, tractor-trailers, trucks, buses, taxis, and limousines, etc. The accident database may include accident data from non-commercial vehicles and commercial vehicles, which will be separately labeled according to the type of vehicles. A vehicle type data may show patterns for different types of vehicles in accidents. Although there are two types of vehicles that have their respective databases, the two types may be combined and integrated in one Unified Database in the system. The users may then be notified about different accidents that occurred at an impact zone and isolated incidents of single accidents. The impact zone may encompass an area which may be within a certain radius of the location with previous accidents. The impact zone may determine whether a user will receive a notification alerting to accident prone areas.

Exemplary embodiments of the present invention include a method and system of a mobile application for mobile device notifications in different situations. These notifications may be generated from the Unified Database that involves the processing and analysis of several data set components: available historical and compiled data from Informational Sources; real-time data as crowdsourced from the user's inputted accident related information; rules and abbreviations data; traffic sign locations and any and all supplemental information as provided and/or verified by the Administrator of the system, all of which are subject to review and/or ratings. Data may be labeled in the database according to its source. The system may use a team of professional individuals with relevant expertise in traffic accidents and/or parking and traffic rules to verify and provide more accurate data for the database. Notifications may be changed or updated depending on data gathered and user reports.

Notifications within the mobile application may be short alerts with brief information about previous accident data at the location. They are brief because the users may receive these notifications on their mobile communications device and may be either driving to their intended destination or distracted from conducting other activities. Notifications alerting the users are generated based on the different categories, types of vehicles, and/or type of plate applicable to the user receiving the notification. Notifications may act as persuasive information in order to inform the user of the potential consequences to avoid the user from taking a chance and be aware of potential accident causes.

Since notifications are short and meant to alert the users with quick information about the accident, the user may utilize the forum function to obtain more comprehensive and detailed information from forum posts which includes but is not limited to inquiries, responses, discussions, pictures, videos, written descriptions, and any other information that may be posted. The forum module with a general forum and a specific forum may be used to analyze the reasons for the accidents, in general or in certain areas and help the users to understand the patterns of the accidents.

According to exemplary embodiments of the present invention, the central server further comprises a microprocessor and a server readable program storage medium. The program storage medium is non-transitory and tangible in nature. The program storage medium embodies a program of instructions executable by the microprocessor to search and update historical accident data in a geolocation and assist avoiding traffic accidents.

According to exemplary embodiments of the present invention, the system comprises a forum module. The forum contains a general forum for general information on ways to avoid accidents, and a specific forum connected to a specific accident location comprising street, road, highway or intersection or not connected to a specific location. The forum module is used to share ideas, raise questions and get answers, concerns, and exchange information related to avoidance of traffic accidents. The exchanged information comprises a category of the users involved in the accident further comprising commercial vehicle the users and non-commercial vehicle the users, motorcyclists, bicyclists and pedestrians, photos, videos and street views of accident locations. Exemplary embodiments of the present invention provides a specific forum platform for the users to share reasons for accidents that may be linked to specific accident locations. In this case, the users may discuss the reasons why the accident occurred, provide photos and videos of the accident, road conditions, street views, comments and suggestions on how to avoid similar accidents in the future. Other users with the identified firsthand experience which originates from the user's personal experience, where they have passed by the specific accident location and have actual knowledge of the accident occurrences at the specific location may choose to vote on best explanation of the accident reasons or suggestion on accident avoidance. The general forum may also be used to share general information on safe driving, accident prevention on highways and roads, and other vehicle related topics, including but not limited to: Auto Accidents and Vehicle Claims, Dangerous or Defective Car Products, Legal Representation, Insurance Claims, etc.

The users can access the forum and all its contents from the mobile application regardless of the user's current location while notifications may be displayed only when the user is approaching the specific location with previous accidents. The users can access the forum regardless of the user's current location because one of the major goals is to introduce accident related information to the user as early as possible to educate the user. Information provided by the users in the forum may supplement and update information provided in notifications. The combination of receiving notifications and accessing a forum may provide more useful and extensive information for the users because notifications provide quick, time sensitive information while the forum provides the detailed, extensive information useful to gain full knowledge of the situation.

The forum module may include two aspects: a forum connected to each specific location on the electronic map of the system of the mobile application and a general forum that is not connected to a specific location and covers general questions. The general forum may have general information to help all the users, for example, incorporate educational safety videos or pictures/videos, highway driving tips, etc. to educate the users of different age groups, driving experience and types of vehicles they drive, how to behave in dangerous situations and respond to road hazards. For example, there may be different videos on how to drive on snow and ice for drivers of automatic and manual vehicles, since automatic and manual vehicles behave on snow and ice differently and may require different approaches to stop the vehicle in case of emergency. Or there may be tips on how to cross the railroad. Nearly two-thirds of all crossing accidents occur during daylight hours. Because two-thirds of all accidents occur at subway or train crossings equipped with automatic warning devices, driver inattention is clearly the major cause of the accidents. The users who are not drivers may also register with the system of the mobile application to receive or provide information. Besides, exemplary embodiments of present invention may inform the users of approaching train and subways by integrating with third party APIs that provide schedule and real-time locations of trains and subways at specific locations and crossings.

The forum will also be connected to specific locations where accident data exists for the locations. In the forum specific to locations, the users can post photos, videos, and see the location by using the Google StreetView™ function. The user can press on a location related to accidents within the map display to choose "Forum," to access the forum function for the specific location which may include different categories where information may be exchanged between users, for example, accident reasons, questions or answers or comments; traffic signs; and/or other categories not included in the above, if any etc. The accident sharing category may allow a user to view comprehensive, detailed information for the location applicable to the accident including but not limited to a copy of the police report without sensitive information; reasons for the accident; time of the accident; and an advisory how to avoid potential accident at the same location, etc. The questions or answers or comments category may allow a user to ask any questions, input any answers, and input any comments related to accidents for the location in addition to viewing all this information contributed by other users. Categories not included in the above may be added or deleted at the discretion of the Administrator of the system. When a user has an inquiry regarding accident information for a location, the mobile application may allow the user to post using the forum function to obtain more information. The user inputted information may be open to comments and/or ratings from other users. The comments with the highest endorsements may be given priority ranking for the position of the comment on a list. The users may also report and rate the reasons for accidents at the location based on their firsthand knowledge. The firsthand knowledge originates from the user's personal experience, where they have passed by the specific location and have actual knowledge of the accident occurrences at the specific location. The reasons for accidents may be ranked according to the amount of positive ratings. The reasons with the most positive ratings may be listed and displayed at the top for other users to view. These reasons will also be incorporated into the notifications used to alert other users of the system. Notifications may be updated if the list of reasons changes according to the user ratings. If ratings reach a certain amount above a threshold set by the system, then the user may receive a credit or reward. The forum may allow other users to provide various comments that include but are not limited to similar accidents and/or situations, etc. Providing a platform through the system for the users to view, read, and obtain information by using the forum module allows the user to become more familiar with the location. Increasing the user's familiarity may help prevent accidents because the user will know what to be cautious of at the intended destination.

The user may be allowed to do a general search regarding accidents in the specific location within the forum or within the system. If the search does not result in an answer that satisfies the user, the user may have the option to post their own inquiry in the forum connecting to the specific location. By educating the users through sharing their own experience, other users may be more conscious of their driving actions, which may help in the avoidance of accidents. All functions of the mobile application, such as notifications and the forum for example, may be available in different languages that can be changed by the user. The system may use a third party service and/or API, for example, Google Translate™, or the Administrator of the system may hire professionals and also competent translators to translate the content to different languages or provide explanations in plain English. The users may also translate information, which may be subject to ratings, in exchange for rewards.

The system of the mobile application may also integrate with a third party electronic map, for example, Google Maps™, to provide a street view function in the forum for places where there may be patterns of high accident occurrences. Other media, for example, photos, videos, etc. for the location may also be provided by the users or employees of the system of the mobile application. This is especially useful for those locations with certain accident patterns where more information should be provided or for those locations where a user may be unfamiliar with to allow the users to better understand and avoid accidents. User's privacy or the public's privacy will be protected when uploading photos, videos, etc.

The alert system may include a server, database, and forum that receives and processes reports from the users' networked mobile devices. The system may process the information reported from the users who enter such information and upload images of accident related information. While accident information may be processed and used to create/update notifications, accident reporting from the users is also connected to the accident sharing forum. After witnessing or getting into an accident, the User can open the mobile application and press a button to report the location of the accident. The User may identify the type of accident to be reported from a menu of available pre-determined types. A multi-level menu system can be used to guide the user to a selection which identifies the type of possible accident type. The server receives the report and the user's geolocation and determines additional contextual information that may be provided by the user and/or the user's mobile phone from the stored user profile. The system may also collect User supplemented information including, but not limited to, personal knowledge and/or time of the accident, the exact location as printed/written on the police report, and the reasons for the accident, etc. The users may also be required to enter information such as photographs, videos, and written explanations to share their ideas on why the accident occurred in the form in connecting with the accident location.

Reported information may be subject to a review and/or ratings by the Administrator of the system and also other users to ensure that credible information is being collected to provide notifications. Comments, suggestions, etc. may be listed in the forum according to ratings, and the ones with the highest amount of positive ratings will be listed at the top so other users can clearly view the postings to gain the best knowledge. The users may be allowed to report to the Administrator of the system any information they may deem inaccurate. The Administrator of the system may be able to open a case where an employee and/or user may be sent to conduct an investigation of the purported inaccurate information to verify the quality of the information. Rewards may be provided for the user of the mobile application who may have assisted in the investigation.

The invention may therefore provide an informational and educational function, where the system of the mobile application provides notifications that will give specific reasons and suggestions on how to avoid the same accident and may persuade the user to not take a chance by being more careful.

The mobile application may alert the user to avoid accidents by notifying the User through email, text message, phone call, phone alert, voice mail etc. automatically at the choice of the users who set this in advance in the settings of the system. A user may customize notifications depending on their preference and driving habits. In terms of distance adjustments, the users who may be quick to take action when alerted may set a notification to be displayed, for example, 50 feet in advance of the accident location. The users who may be slow to take action when alerted may want to set a notification to be displayed, for example, 200 feet in advance of the accident location to allow the user more time. In terms of time adjustments, the users may indicate in the system at what time in advance to send the notification to alert the user. The system may also allow for the users to adjust the amount of times these notifications may repeat and distance of the notifications depending on the user's preferences. If the user understands the notification quickly, the user may want to have the notification only alert them once. However, if the user needs the notification to be repeated then the user may set the alert to appear one or more times depending on the user's preference, for example 100 feet, 200 feet, or 300 feet ahead. If the user is experiencing too many notifications, the user may turn off the notifications in real-time by speaking a voice prompt to the system, for example, "Thank you, please turn off." The user may also turn on notifications through voice prompts. Functionalities within the system of the mobile application, notably the user reporting function, may integrate with third party APIs to provide voice-to-text capabilities. The users who utilize the voice-to-text function may record their voice by speaking their statements into the microphone of the mobile communications device, which the system may change to text within the mobile application. Accordingly, the users may not necessarily have to enter information manually and may submit information to the system by recording their voice statements. Notifications whether written or by voice, are available in a variety of languages and may be changed by the user according to their preferences.

The system of the mobile application may also provide a street view function of dangerous locations with track record of previous accidents in the forum. This feature may let the users see the actual road conditions before they go to their intended destination and help them avoid getting into the accidents. Other media, for example, photos, videos, etc. for such location may also be provided by the users or employees of the system of the mobile application. This is especially useful for those locations with certain accident patterns where more information should be provided or for those locations where a user may be unfamiliar with to allow the users to better understand and avoid accidents. A user or the public's privacy will be protected when uploading photos, videos, etc. So, for example, a video or a picture with the exact geolocation on the highway may be uploaded to the system to alert the users about dangerous curves or potholes that could affect driving safety or lead to a vehicle damage or accident. Potholes are bowl-shaped openings in the road and represent one of the top causes of accidents. While a bumpy road may be a minor nuisance to drivers, a road littered with potholes can cause serious property damage to the vehicle and even result in an accident. Potholes can come in all shapes and sizes. Even potholes that are small enough to just seem annoying can cause damage and put a huge strain on a vehicle's shocks and suspension. A big enough pothole can actually cause an impact similar to a 35 mph accident. This can cause serious damage to the vehicle and also result in an accident. Even with all of the highway repairs and construction, there are more and more accidents caused by potholes that have been neglected by the city and/or county for far too long. When a vehicle goes over a big enough pothole, the vehicle may not be able to handle the blow. This sudden and unexpected impact can cause a driver to lose control of their vehicle and as a result end up in an accident where they may be seriously injured. Even though potholes can cause vehicular accidents and truck accidents, the most serious of these types of accidents are pothole motorcycle accidents. Motorcycle drivers are at special risk because a motorcycle has less weight and only two wheels on the ground. Even when wearing a helmet, a pothole accident on a motorcycle can cause serious injury and even death. Also bicycle accidents caused by potholes is a serious cause for concern for cyclists as poorly maintained roads and paths can cause serious injury to cyclists. Bicycle accidents caused by potholes can injure the cyclists as a result of being dismounted as a result of breaking suddenly to avoid a pothole or hit by another vehicle when suddenly swerving around the pothole.

Exemplary embodiments of the present invention may contain a pothole database, historical data may be collected from government websites about dangerous potholes along their routes. Real-time crowdsourcing by the users may help to keep the database updated and reflect changes in the road conditions to inform the users. Cities and municipalities are required to fix and maintain proper roads and highways so they are free of damages and defects. Thus, exemplary embodiments of the present invention may be used for educational purposes to help the users avoid accidents, as well as help establish negligence on the part of the city or county that could make the difference between receiving the financial compensation you or nothing at all in case of injuries and property damage.

The abundance of alerts can create the possibility of receiving an unlimited amount of alerts while a user is traveling to their destination. Therefore, the mobile application may allow the user to turn these alerts on or off, through voice prompts and/or manually in the settings as described further below, depending on their preference. Turning alerts on or off through voice prompts may be applicable when a user is driving. When the user is not driving, the user may turn alerts on or off manually in the settings of the mobile application on their mobile device or on the mobile application's website according to the user's preferences. The users may be allowed to switch between turning the alerts on or off depending on if they are experiencing too many alerts and are already familiar with such alerts. If the user switches the alerts to off, the system may still allow them to switch it back on when they start on another route again. Accordingly, the notification system can be turned on/off through voice prompts or manually based on the user's preferences.

Since the built-in microphone on most mobile devices may not be strong enough to record voice prompts from distances that are not in close proximity, the system of the mobile application may be paired with a separate speaker attachment/apparatus. This separate speaker attachment/apparatus may physically connect to the mobile device and as a result, enable the system of the mobile application to pick up voice prompts for further distances. Therefore, the separate speaker attachment/apparatus may allow the user to speak voice prompts up to a certain distance.

Exemplary embodiments of the present invention may allow for dynamic reporting of historical and real-time accident information. The mobile application may track certain routes that the user drives through on a more frequent basis and may use this information to notify the user when there are any accident problems occurring on that route. This may prepare users before they start on their trip to their destination. The other part of the dynamic reporting function is the live-reporting function where the mobile application may provide real-time accident reports along the route the user is driving on at the moment. This helps the users save time and helps safety by avoiding accident-prone areas along their route. In addition, the searches performed by the user may also be tracked and saved by the mobile application so that in the future, if there are any new reports of accidents, the user can be notified of these updates. The user may set this function for routes frequently traveled on or favorite certain routes in their search history. Therefore, this function allows the user to be up to date with all reports depending on where they may be traveling to or where they are located.

Sharing this information may trigger the mobile application to send useful notifications to other users who may benefit from the information based on their location and/or circumstances. Therefore, when the system of the mobile application recognizes other users who may be in the same location at the same time, the mobile application may automatically provide a notification indicating important, resourceful information about the accident.

Exemplary embodiments of the present invention can be integrated with in-vehicle systems to enable the system to fully function within a vehicle. This integration is not limited to in-vehicle systems and may also be integrated in the vehicle by original equipment manufacturer or third-party add-on equipment that may be mounted within a vehicle. Exemplary embodiments for direct integration of the disclosed accident information system can be integrated directly into the navigation and GPS System in an onboard device of original equipment manufactured vehicles and into a vehicle's navigation device.

When integrated into an in-vehicle navigation system, the vehicle's display may be used to show potential accident notifications in accordance with exemplary embodiments of the present invention as described above. Remote updates and communications to the user can be provided through the installed disclosed accident related information to alert the user for example, when the user is approaching a location prone to frequent accidents with the reason why accidents occur and/or how to avoid a potential accident.

Integration may include utilization of vehicle equipment, for example speedometer, accelerometer, cameras, GPS, and any other applicable equipment, etc. Utilization of this vehicle equipment may be used to obtain comprehensive real-time and historical activity information about the vehicle, for example its direction, speed, orientation and acceleration, etc. in order to issue applicable notifications to the users.

Exemplary embodiments of the present invention may be used by the public and/or computer systems, of which some examples include but are not limited to: vehicles, driverless vehicles, websites, in-vehicle systems, Global Positioning Satellites (GPS), and/or other electronic systems, or as a mobile application on a mobile communications device, which may include smartphones, tablets, laptops, desktop computers, in-dash vehicle systems, etc. Exemplary embodiments of the present invention are not so limited, and may also be expanded to encompass other systems or services which may process, utilize, and display the accident related data. Online mapping systems, global positioning system (GPS) or mobile communications device manufacturers, wireless service providers, mobile application creators and developers, etc. may greatly benefit from the information collected and disseminated by various exemplary embodiments of the present invention.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

FIG. 1A illustrates a diagram of the system for mapping and storing traffic accidents and alerting a user of potential traffic accidents, according exemplary embodiments of the present invention. With respect to FIG. 1, the system comprises a unified database 101, a location identifier 102, a data processing module 103 and a display apparatus 104. The unified database 101 comprises traffic accidents related data for different categories of the users, such as commercial or non-commercial vehicle users, motorcyclists, bicyclists and pedestrians. The unified database 101 contains historical and real-time traffic accident information and resides in a central server 105. The unified database 101 is synchronized with the location identifier 102 based on the type of the user. The data processing module 103 is connected to the location identifier 102 and the unified database 101 through a communication medium. The display apparatus 104 is connected to the data processing module 103.

Figure 1B:
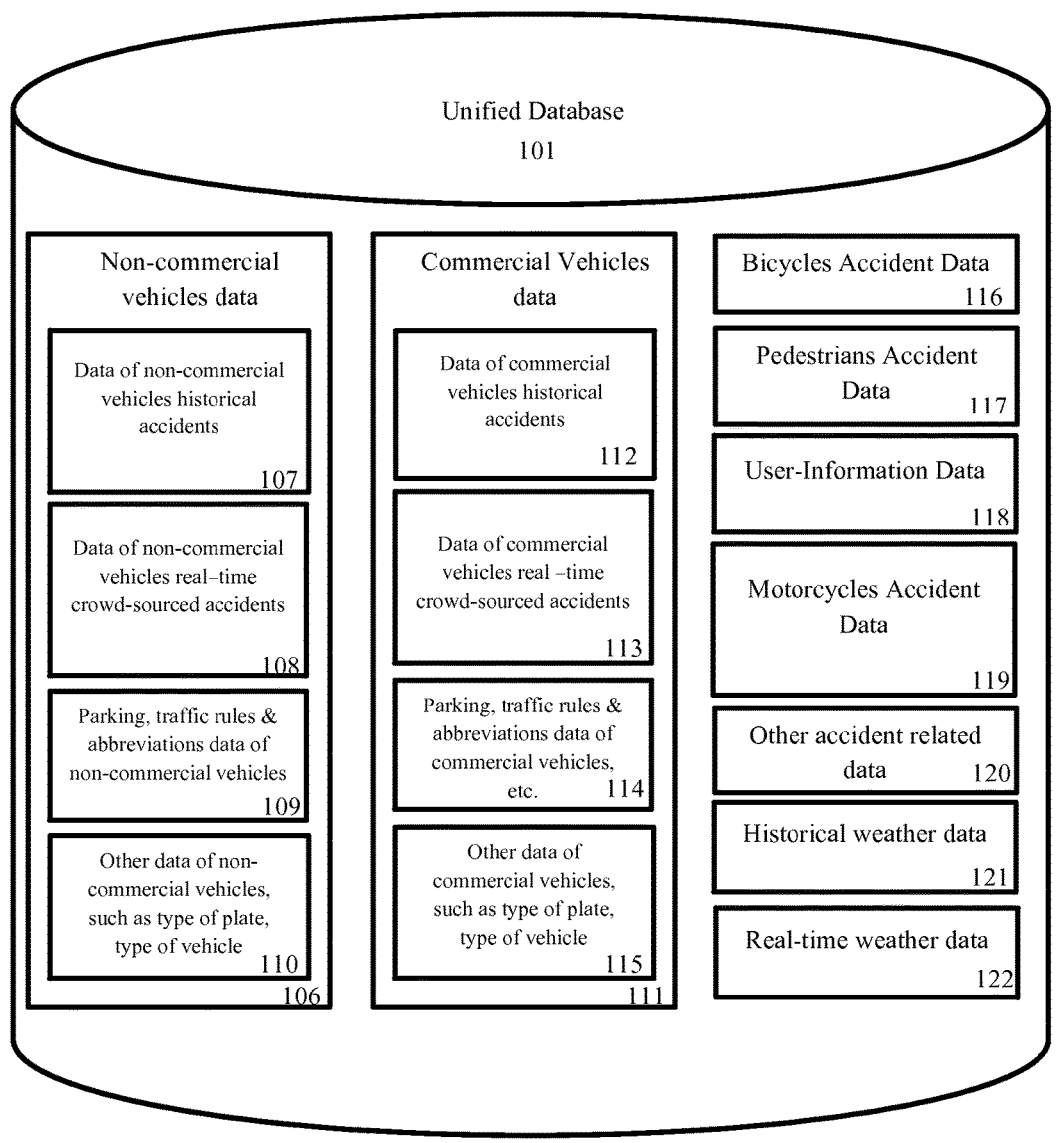
FIG. 1B is a diagram illustrating a Unified Database, according to exemplary embodiments of the present invention.

FIG. 1B is a diagram illustrating a Unified Database, according to exemplary embodiments of the present invention. Data sets are categorized according to non-commercial vehicles data 106 and commercial vehicles data 111 in the Unified Database 101. Non-Commercial Vehicles Data Set 106 includes non-commercial vehicles historical accidents data 107, non-commercial vehicles real-time crowdsourced accidents data 108, parking and traffic rules and abbreviations data for non-commercial vehicles 109 because violations of parking and traffic rules may result in vehicle accidents, and other non-commercial vehicles data relevant to non-commercial vehicles data 110, such as type of vehicles, type of vehicles' plate and other data related to non-commercial vehicles. Commercial Vehicles Data Set 111 applies to commercial vehicles only that includes type of vehicles, type of vehicles' plate and other data related to commercial vehicles, which includes commercial vehicles historical accidents data 112, commercial vehicles real-time crowdsourced accidents data 113, parking and traffic rules and abbreviations data commercial vehicles 114 because violations of parking and traffic rules may result in vehicle accidents, and other commercial vehicles data relevant to commercial vehicles data 115. The central computer system may retrieve data stored in User-information data 118 that includes User-information data, such as type of the vehicles, type of plates, etc. Additionally, User-information data set 118 is also used to store User profiles, settings, preferences, User-input reliability and prevent system abuse.

Once standardized and made unambiguous, the central computer system may interpret the accidents data from the Unified Database 101 to understand the reasons for the occurrence of accidents in a specific area. These rules may be mathematical functions that take as input, location, day and time, and provide as output, an indication as to whether the provided location, day, and time is associated with accidents. These rules may be stored in a parking and traffic rules data set for non-commercial vehicles 109 and commercial vehicles 114. The non-commercial vehicles accident data set 106 and the commercial vehicle accident data set 111 may be retrieved to generate the corresponding notifications to Users. The parking and traffic rules and abbreviations data set for non-commercial vehicles 109 and commercial vehicles 114 may be retrieved to help standardize parking and/or traffic violation data, as this data may tend to utilize various abbreviations and jargon that may be particular to certain sources. Other accident related data 120 relevant to providing effective alerts may also be input into the unified database 101.

The unified database 101 may also include bicycles accident data 116 for any accidents involving bicycles and bicyclists. The unified database 101 may also include pedestrian's accident data 117 for any accidents involving pedestrians. The unified database 101 may also include motorcycles accident data 119 for any accidents involving motorcycles. The unified database 101 may also include weather-related data to connect with locations containing accident data. Historical weather data 121 may connect to historical accident data to find existing information about the correlation between a certain weather occurrences and accidents. Historical weather data 121 may connect with non-commercial vehicles historical accident data 107 and commercial vehicle historical accident data 112 to obtain correlation information, which may be used with real-time weather data 122 to determine if a notification will be sent to Users whose current location indicates the User may be subject to weather-related accident advisories to avoid any potential accident because of similar weather situations.

Figure 2:
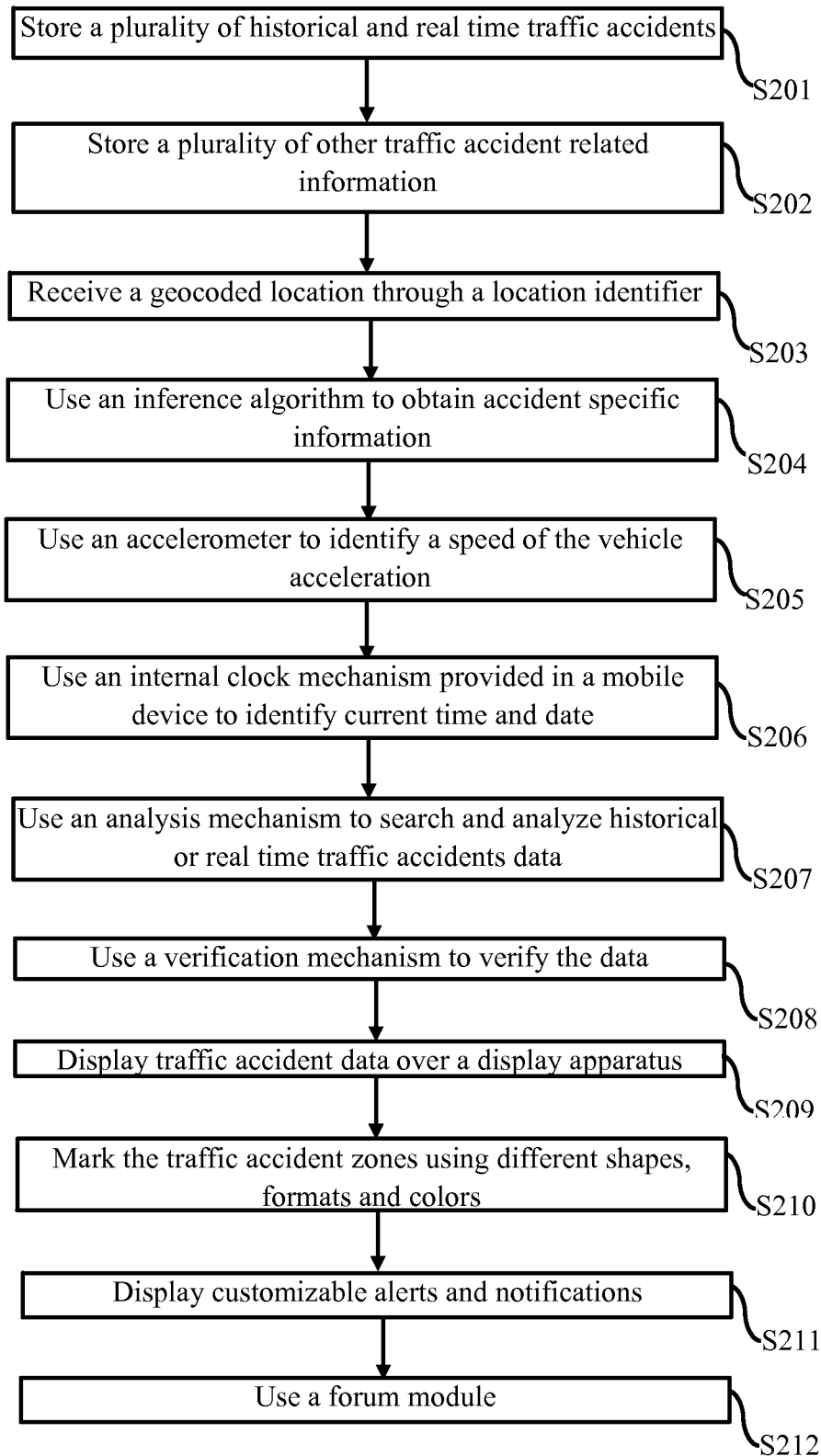
FIG. 2 illustrates a flowchart of a method for mapping and storing traffic accidents and alerting a user of traffic accidents, according to exemplary embodiments of the present invention.

FIG. 2 illustrates a flowchart of a method for mapping and storing traffic accidents and alerting a user of traffic accidents, according to exemplary embodiments of the present invention. With respect to FIG. 2, the method for mapping traffic accidents, storing historical and real-time traffic accidents data, other accidents related information comprises storing a plurality of historical and real-time traffic accidents for different categories of the users in a unified database (Step 201). The method further stores a plurality of other traffic accident related information, comprising reasons, time and data, category of the accident participants (e.g. age, gender, education, etc.), further comprising non-commercial vehicles or commercial vehicles, motorcyclists, bicyclists or pedestrians (Step 202). The method further receives a geocoded location through a Global Positioning module of a location identifier (Step 203) and obtain accident specific information through an inference algorithm (Step 204). The method implements an accelerometer to identify when the vehicle starts accelerating (Step 205) and an internal clock mechanism to identify current time and date (Step 206). The method further comprises using an analysis mechanism to search and analyze historical or real-time traffic accidents data based on the category the user belongs to specific geocoded location (Step 207). The unified database performs a location and related history search through a microprocessor stored in a central server and uses a verification mechanism to verify the searched data (Step 208). The method displays the historical traffic accident data over a display apparatus (Step 209) and marks the traffic accident zones using different formats such as shapes, lines, or colors (Step 210). The method further comprises displaying customizable alerts and notifications (Step 211) and using a forum module with a specific forum to share ideas, raise questions and get answers, concerns, provide and obtain all traffic accidents related information comprising reasons, violated parking and traffic rules and accidents prevention methods (Step 212). The forum module contains two aspects: a general forum and a specific forum. The general forum module is for users to discuss and obtain information on general topics on how to avoid accidents, for example precautions for driving on a highway. The specific forum is connected to specific locations where there are accidents and will indicate the specific reasons for these accidents at the locations, which are voted on by users with firsthand experience. The general forum and specific forum connect with each other.

Figure 3:
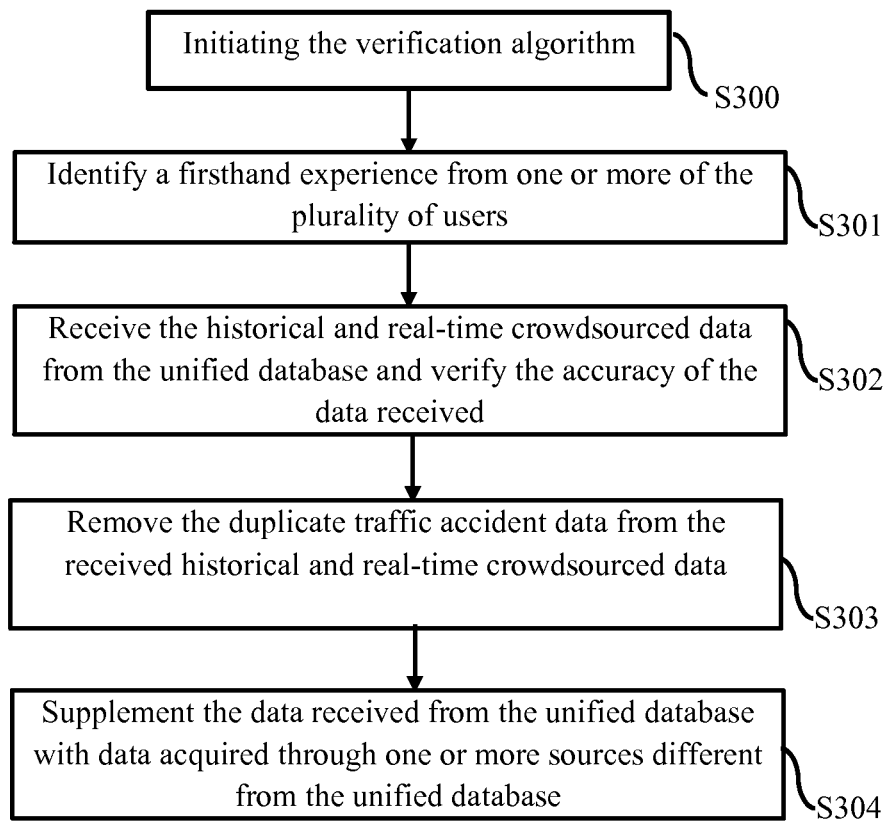
FIG. 3 illustrates a flowchart for the verification algorithm, according to exemplary embodiments of the present invention.

FIG. 3 illustrates a flowchart for the verification algorithm, according to exemplary embodiments of the present invention. With respect to FIG. 3, the verification algorithm begins by initiating the verification algorithm (Step 300) to identify a firsthand experience from one or more of the plurality of the users already received a notification about potential accidents by passing through the location identified to have historical or real-time accidents (Step 301). Then the system receives the historical and real-time crowdsourced data from the unified database and verifying the accuracy of the data received therefrom (Step 302). The system then removes the duplicate accident data from the received historical and real-time crowdsourced data (Step 303); and supplements the data received from the unified database with data acquired through one or more sources different from the unified database (Step 304).

FIG. 4 is a flowchart that illustrates the workflow of how an in-vehicle navigation system works, according to exemplary embodiments of the present invention. When User starts to use the In-Vehicle Navigation System (Step 401), and fills in the intended destination (Step 402), then the In-Vehicle Navigation System starts to navigate the User to the destination (Step 403). The In-Vehicle Navigation System also records the vehicle data and uploads the data to the server through the base station and Internet (Step 404). Based on the user's speed and location, if the system detects potential accidents based on the unified database and geo-location of vehicle's current location (Yes, Step 405), then the in-vehicle navigation system will issue an alert advisory notification (Step 406). If there are no potential accidents detected (No, Step 405), then the system will continue to monitor the user's speed and location for potential accidents. The end of the process is achieved at (Step 407).

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A computer-implemented system for providing traffic accident avoidance guidance, comprising:
   a computing system comprising at least one processor configured to notify a user to avoid a potential traffic accident; and
   a database storing traffic accident relevant data by one or more data types comprising at least one of commercial vehicle, non-commercial vehicle, type of vehicle, type of vehicle plate, motorcycle, bicycle, or pedestrian,
   wherein the at least one processor is configured to:
      receive, from the user through a remote computing device, user data comprising a location and a present time;
      selectively retrieve, from the database, a portion of the traffic accident related data corresponding to the location and the user based on the user data;
      selectively generate a notification for the location based on the selectively retrieved portion of the traffic accident related data, wherein the notification includes a reason for one or more traffic accidents at the location or a recommendation for avoiding the potential traffic accident at the location;
      transmit the notification to the user and one or more additional users;
      receive, from the one or more additional users through one or more additional computing devices, one or more ratings of the notification; and
      responsive to the notification receiving a predetermined number of positive ratings, issue a reward to a contributor of at least a part of the reason or the recommendation.

2. The system according to claim 1, further comprising:
   responsive to the notification receiving a predetermined number of negative ratings, generating a second notification based on a modified portion of the traffic accident related data stored in the database.

3. The system according to claim 1, wherein the traffic accident related data includes crowdsourced data from a plurality of additional users, and wherein the crowdsourced data includes at least one or more reasons for one or more accidents which occurred in one or more locations or one or more recommendations for avoiding accidents in one or more locations.

4. The system according to claim 1, wherein the one or more additional users has firsthand experience with the location identified in the notification, and wherein the firsthand experience is identified as passing or having passed within a predetermined distance of the location identified in the notification.

5. The system according to claim 4, wherein the firsthand experience is determined by receiving location data generated by a global positioning system (GPS) unit of a remote computing device corresponding to a particular location of a particular additional user.

6. The system according to claim 5, wherein the GPS unit is installed within a mobile device or a navigation system in a vehicle.

7. The system according to claim 1, wherein the at least one processor is further configured to:
   enable the user to customize at least one of a predetermined distance from the location or a predetermined time period for receiving the notification and a predetermined number of times for repeating the notification.

8. The system according to claim 1, wherein the user data received from the user further comprises at least one user type comprising commercial vehicle user, non-commercial vehicle user, user type based on vehicle type, user type based on vehicle plate type, motorcyclist, cyclist, or pedestrian.

9. The system according to claim 1, wherein the traffic accident related data includes at least one of: a parking rule, a traffic rule, sign data, a violation code, the reason, the recommendation, a plurality of locations corresponding to a plurality of traffic accidents, a plurality of times of a plurality of traffic accidents, a plurality of dates of a plurality of traffic accidents, at least one accident type, at least one abbreviation used by law enforcement personnel, information associated with at least one vehicle involved in each of a plurality of traffic accidents, information associated with people involved in a plurality of traffic accidents, or road conditions at a time a plurality of traffic accidents occurred.

10. The system according to claim 9, wherein the traffic accident related data is acquired from at least one of: a police department, a department of transportation, a government agency, a government agency website, a non-government organization, a private entity, a community organization, television, radio, broadcast news, an on-the-scene reporter, a traffic accident news analyst, an individual, a blog post, a social network, a newspaper, a professional article, or another accident data resource.

11. The system according to claim 9, wherein the traffic accident related data includes, for each of the at least one accident type, at least one of: a type of vehicle, a type of vehicle plate, a number of vehicles, a cost of the traffic accident, or personal information associated with people involved in the traffic accident, and wherein the at least one accident type is categorized according to commercial vehicle, non-commercial vehicle, type of vehicle, type of vehicle plate, motorcycle, bicycle, or pedestrian.

12. The system according to claim 1, wherein the traffic accident related data includes one or more reasons for one or more accidents, and includes at least one of: a driver, a motorcyclist, a pedestrian, a bicyclist, a vehicle, an animal or a roadway condition.

13. The system according to claim 1, wherein the location of the user and the present time are cross-correlated with the traffic accident related data associated with previously incurred traffic accidents at the location to predict a potential traffic accident at the location, and wherein the previously incurred traffic accidents occurred during a time frame which includes the present time.

14. The system according to claim 1, wherein the reason includes at least one of: excessive speed, reckless driving, a violation of parking rules, a violation of traffic rules, failure to perceive a traffic situation, a sign, a signal, fatigue, driving under the influence, a vehicle defect, a pothole, a road condition, a road design, weather, an environmental factor, or another reason contributing to the traffic accident at the location.

15. The system according to claim 1, wherein the recommendation includes a street view of the location to allow the user to see actual road conditions, and wherein the street view is displayed as at least one of an image or a video.

16. The system according to claim 1, wherein the database stores accident types comprising at least one of: vehicle-vehicle, vehicle-motorcyclist, vehicle-bicyclist, vehicle-pedestrian, motorcyclist-motorcyclist, motorcyclist-bicyclist, motorcyclist-pedestrian, bicyclist-bicyclist, bicyclist-pedestrian, or other accident types comprising at least one of road debris, potholes, or animals involved in one or more traffic accidents.

17. The system according to claim 1, wherein the database additionally stores relevant information associated with one or more vehicles or people involved in the one or more traffic accidents wherein the relevant information associated with the one or more people involved in the one or more traffic accidents comprises at least one of:
　　age, gender, occupation, education, marital status.

18. The system according to claim 17, wherein the one or more processors are further configured to analyze the traffic accident data to predict the potential traffic accident, and the traffic accident data analyzed is applicable to the user by inference based on the relevant information.

19. A computer-implemented system for providing traffic accidents avoidance guidance through a plurality of computing devices, the system comprising:
　　at least one processor configured to:
　　　　store traffic accident related data in a database according to at least one data type comprising commercial vehicle, non-commercial vehicle, type of vehicle, type of vehicle plate, motorcycle, bicycle, or pedestrian;
　　　　receive user data from a user comprising a location, a present time, and at least one user type comprising commercial vehicle user, non-commercial vehicle user, user type based on vehicle, user type based on vehicle plate, motorcyclist, cyclist, or pedestrian;
　　　　selectively retrieve, from the database, a portion of the traffic accident related data having at least one particular data type corresponding to the location and the user type of the user;
　　　　selectively generate a notification based on the selectively retrieved portion of the traffic accident related data, wherein the notification includes a reason for one or more traffic accidents at the location, or a recommendation for avoiding the potential traffic accident at the location;
　　　　receive, from one or more additional users through one or more computing devices, one or more ratings of the notification, wherein the one or more additional users who provide the ratings have firsthand experience identified as passing or having passed within a predetermined distance of the location; and
　　　　responsive to the notification receiving a predetermined number of the positive ratings, issue a reward to a contributor of at least a part of the reason or the recommendation.

20. The system according to claim 19, wherein the at least one processor is further configured to:
　　enable the user to customize a format of the notification or a predetermined number of notification repetitions, wherein the format comprises at least one of: audio, voice, text, video, image, or multimedia.

21. The system according to claim 19, wherein the at least one processor is further configured to:
　　enable the user to customize at least one of a predetermined distance from the location or a predetermined time period for receiving the notification, to receive the notification as the user approaches the location.

22. The system according to claim 19, wherein the at least one processor is further configured to:
　　responsive to the location being associated with a predetermined number of previous accidents, display the location to the user using different formats including at least one of: colors, dots, lines, or circles, and
　　wherein the formats are used to identify at least one of: a specific location, a street, or a block.

23. The system according to claim 19, wherein the notification is automatically generated responsive to the user entering a geographic region within a predetermined distance of the location.

24. The system according to claim 19, wherein the traffic accident related data stored in the database comprises historical traffic accident relevant data interactively correlated to crowdsourced traffic accident relevant data.

25. The system according to claim 19, wherein the at least one processor is further configured to:
　　issue the notification to the user for the location based on at least the data type corresponding to a user type of the user in accordance with at least one of:
　　　　commercial vehicle relevant data corresponding to at least a commercial vehicle user type;
　　　　non-commercial vehicle relevant data corresponding to at least a non-commercial vehicle user type;
　　　　motorcyclist relevant data corresponding to at least a motorcyclist user type;
　　　　bicyclist relevant data corresponding to at least a bicyclist user type; or
　　　　pedestrian relevant data corresponding to at least a pedestrian user type.

26. The system according to claim 19, wherein the at least one processor is further configured to:
　　display a comparison of traffic rules for different jurisdictions, wherein the comparison is made based on the location and a license jurisdiction obtained from the user data, wherein information obtained from the user data indicates at least one of: a country, a state, a city, or a region which defines the license jurisdiction issuing a driver's license for the user.

27. The system according to claim 26, wherein the comparison is displayed to the user based on a user type when the user approaches a particular location having a predetermined minimum number of traffic accidents previously incurred.

28. The system according to claim 19, wherein the system is provided with integrating access to at least one third-party application program interface (API), wherein the third-party API provides a schedule of arrival times for public transportation with real-time updates for a particular location associated with public transportation and at least one previously incurred traffic accident, and wherein the user is notified of potential dangers responsive to approaching the particular location; or
　　wherein the system is provided with integrating access to at least one third-party API which provides weather related information to identify weather conditions.

29. The system according to claim 19, wherein the reason or the recommendation is updated responsive to the ratings of the notification reaching a particular predetermined number.

30. The system according to claim 19 identifies one or more location comprising intersections or locations having no stop signs or signal lights, wherein an information about the locations are reported by various informational sources comprising at least one of:
　　newspapers, social media, blogs, and supplemented by user reports and the administrator of the system, wherein the locations' information resides in a database to alert users through the display apparatus.

* * * * *